(12) United States Patent
Stubblefield (10) Patent No.: US 8,156,298 B1
(45) Date of Patent: Apr. 10, 2012

(54) VIRTUALIZATION-BASED SECURITY APPARATUSES, METHODS, AND SYSTEMS

(76) Inventor: Adam Stubblefield, Incline Village, NV (US)

( * ) Notice: Subject to any disclaimer, the term of this patent is extended or adjusted under 35 U.S.C. 154(b) by 719 days.

(21) Appl. No.: 12/258,378

(22) Filed: Oct. 24, 2008

Related U.S. Application Data (60) Provisional application No. 61/000,162, filed on Oct. 24, 2007, provisional application No. 61/007,395, filed on Dec. 12, 2007, provisional application No. 61/061,399, filed on Jun. 13, 2008.

(51) Int. Cl.
*G06F 12/00* (2006.01)
(52) U.S. Cl. ....................................... 711/163
(58) Field of Classification Search ........................ None
See application file for complete search history.

(56) References Cited

U.S. PATENT DOCUMENTS

| | | | |
|---|---|---|---|
| 7,640,543 B2 * | 12/2009 | Vij et al. ........................... | 718/1 |
| 2007/0266389 A1 * | 11/2007 | Ganguly et al. ............... | 718/104 |
| 2008/0256349 A1 * | 10/2008 | Dennis et al. ..................... | 713/1 |

* cited by examiner

*Primary Examiner* — Hiep Nguyen (57) ABSTRACT

Apparatuses, devices, and methods for protecting content on a computer are disclosed that employ a novel hypervisor configured to segregate, or partition, hardware resources or portions thereof into protected and unprotected areas and devices. The partitioning, effectively hides protected hardware resources, such as the BIOS device, etc., from operating systems running on the computer. The hypervisor controls access resources into the protected area and limits the manner in which the operating systems on the computer can access the protected resources and content. The hypervisor can be configured to physically partition entire hardware resource or to employ virtualization technology to partition hardware resources, such as memory devices, into protected and unprotected areas that are virtually partitioned. The hypervisor of the present invention provides a new concept in employing anti-forensic techniques to bring about a protection mechanism that prevents unauthorized users including remote attackers who have obtained administrative access from accessing, reverse engineering, or otherwise exposing content protected. The content can generally be anything that can be maintained in a computer including data, algorithms, code, information and processes in general, etc., such as personal, sensitive, confidential and proprietary information and algorithms, and cryptographic keys.

20 Claims, 4 Drawing Sheets

VIRTUALIZATION-BASED SECURITY APPARATUSES, METHODS, AND SYSTEMS

CROSS-REFERENCE TO RELATED APPLICATIONS

This application claims the benefit of U.S. Provisional Application No. 61/000,162 filed Oct. 24, 2007, U.S. Provisional Application No. 61/007,395 filed Dec. 12, 2007, and U.S. Provisional Application No. 61/061,399 filed Jun. 13, 2008, all of which are incorporated herein by reference.

STATEMENT REGARDING FEDERALLY-SPONSORED RESEARCH AND DEVELOPMENT

Not Applicable.

FIELD OF THE INVENTION

The present invention relates generally to protecting content and more particularly to preventing access to protected content in a computer by people not authorized to access the protected content including attackers who have obtained administrative access to the computer.

BACKGROUND OF THE INVENTION

A computer is comprised of various hardware components, typically including a chip containing program instruction for implementing a Basic Input/Output System ("BIOS"), a Central Processing Unit ("CPU" or "processor"), Random Access Memory ("RAM"), one or more storage devices such as a hard drive and optical drives, and one or more Input/Output ("I/O") devices such as a monitor, a mouse, and a keyboard. When a computer is powered on, the processor first accesses the chip containing the BIOS program instructions which are then executed by the CPU. The BIOS program instructions are designed to identify and initialize the various components in communication with the CPU. The BIOS program instructions typically end by invoking an operating system ("OS"), such as Microsoft Windows or Linux.

These operating systems may be configured to provide different access levels for different users. Typically, users are divided into two groups: Administrators or root users, who have unrestricted access to all components of the computer, and standard or guest users who have restricted or limited access to computer components. Standard users may be prevented from changing start up or boot parameters such as the designation of the operating system to be invoked at the end of the BIOS program instructions. Standard users may also be restricted from accessing certain components, such as the BIOS chip or portions of components such as a hard drive.

By configuring access levels, content may be protected by preventing standard users from accessing the content. However, a user who obtains administrator or root user level access can access the protected content. Various techniques have been used to prevent access by either an administrator or standard users to content, such as sensitive algorithms or cryptographic keys.

In one technique, data to be protected is stored on a Peripheral Component Interconnect (PCI) card in communication with the CPU via a PCI bus. For example, a sensitive data processing algorithm may be stored on the PCI board. When an application needs to process data using the algorithm, the data may be passed to the PCI card as the argument of a function call. The PCI card receives the argument and inputs it to the data processing algorithm stored on the PCI board. The result of the algorithm is then output by the PCI card. This technique allows both administrator and standard users to utilize the algorithm to process data while preventing direct access to the algorithm. One disadvantage of this technique is that it requires the addition of a PCI card to the computer.

Another technique is hardware virtualization. Hardware virtualization is a method of allocating hardware for use by specific software. Hardware virtualization may be implemented using a Virtual Machine Monitor ("VMM"), or hypervisor, to support the operation of one or more operating systems, i.e., virtual machines ("VM"), on a single computer by allocating portions of available hardware for use by each VM.

Virtualization-based rootkits suffer from two main problems. Because processors only include one set of virtualization features, whoever starts using them first "wins." Therefore, these rootkits can be defeated by always using these features before the rootkit gets a chance to initiate. The second problem is that there are ways to detect whether a virtualization-based rootkit is resident. In addition, recent virtual machine monitors have become so complex that it is difficult to determine all possible security vulnerabilities. As a result, many virtual machine monitors do not provide much more protection than the traditional boundary between user-space and the kernel. What is needed is a method of protecting content in a computer that provides a high level of security with the minimal addition of components and complexity.

BRIEF SUMMARY OF THE INVENTION

The present invention provides a new concept in employing anti-forensic techniques to implement a hypervisor and bring about a protection mechanism that prevents unauthorized users including remote attackers who have obtained administrative access from accessing, reverse engineering, or otherwise exposing content protected using the present invention. The content can generally be anything that can be maintained in a computer including data, algorithms, code, information and processes in general, etc., such as personal, confidential, sensitive, and proprietary information, algorithms and processes, and cryptographic keys, in addition to the hypervisor code and its associated content. The protection mechanism implements, or perhaps stores, itself in the BIOS instructions, so that it is guaranteed to run first when the system boots. Also, the protection mechanism uses the hardware virtualization features of modern commodity processors to protect itself. Unlike the prior art, the hypervisor of the present invention further enables computer resources to be configured such that various types of content can be protected, accessed, and used in the operation of the computer without jeopardizing the security of the content and to prevent access to various hardware resource, such as the BIOS device, or portions thereof by the operating systems and applications running thereon.

The protection mechanism can be implemented as follows. A standard BIOS is replaced with a modified BIOS code that creates an extremely minimal hypervisor, and the code and keys to be protected. The modified BIOS performs the initial set-up and enables the RAM and then passes control to the minimal hypervisor. The hypervisor uses the hardware virtualization features of the processor to create an area of memory that will be invisible to any operating systems and devices other than the processor. It loads the protected software into this area of memory and hides the BIOS. The hypervisor can then launch the operating system with full unmediated access to the computer hardware, with the exception of the protected memory and the BIOS. When the operating system instance wants to run the protected code, it uses a hypercall to pass the parameters to the hypervisor. The hypervisor then runs the protected code and returns the result to the OS. Even a root user is unable to see the code that is being run by the hypervisor.

The present invention avoids disadvantages of BIOS and prior virtualization-based solutions. We avoid the problem with virtualization rootkits by embedding the protection mechanism in the BIOS, which is always executed first. The problem of detection is overcome in the present invention, because even if the present invention is detected, a competing malicious virtualization rootkit could not be run before the present invention, because the present invention is run in the BIOS, which in turn protects the BIOS from alteration. A major concern for BIOS-based rootkits is that they can be evicted by software. The protection mechanism enabled by the present invention prevents such an eviction by using the hypervisor to disallow software access to the BIOS.

The present invention avoids complexity issues of traditional hypervisors used to manage operating systems by merely setting up the hardware protection features and then "getting out of the way" until the operating system requests that the protected content be accessed and allowing the operating system direct access to the unprotected hardware. The hypervisor of the present invention has the additional advantage of requiring extremely low overhead beyond the cost of the hypercalls to the hypervisor. Of course, the mechanism could be used with traditional hypervisors/VMMs, which can allocate the unprotected hardware to one or more VMs. The minimal hypervisor approach to the present invention facilitates a well controlled interface to provide better control of vulnerabilities or side channels such as timing or cache usage that could jeopardize code being protected by the present invention.

These and other advantages of the invention will be apparent to those of ordinary skill in the art by reference to the following detailed description and the accompanying drawings.

DETAILED DESCRIPTION OF THE INVENTION

Figure 1:
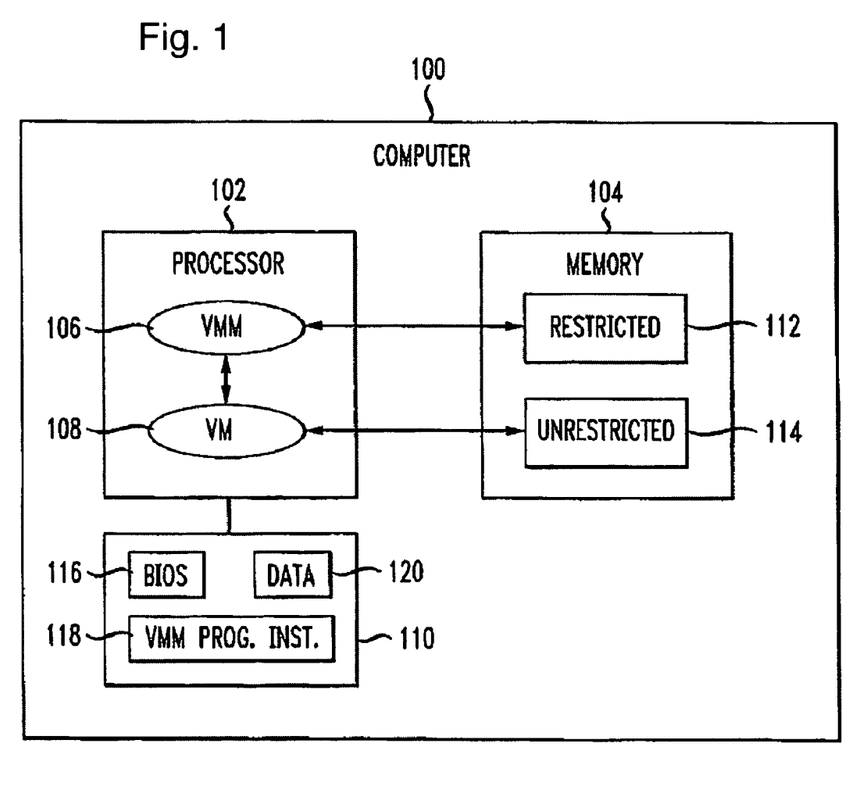
FIG. 1 shows a computer having a processor supporting a virtual machine monitor preventing access to a protected area of a memory device in accordance with one embodiment of the present invention.

FIG. 1 depicts a computer 100 including a Central Processor Unit ("CPU"), or processor, 102, BIOS device 110 and memory 104. Computer 100 typically includes other components such as storage devices and network interfaces, and some other components, such as additional processors including GPUs and accelerators, which have been omitted from FIG. 1 for clarity. In one embodiment, processor 102 is adapted to receive instructions from and support the operation of a hypervisor 106.

The hypervisor 106 is software designed to control access to a computer's hardware resources to enable some of the computer resources to dedicated to protected tasks ("protected hardware"), which are inaccessible from the remaining hardware that can be used for unprotected tasks ("unprotected hardware").

The hypervisor 106 can be implemented in various manners ranging from complete physical/logical partitioning of computer resources to completely virtualized partitioning of resources and various combinations thereof. The implementation of the hypervisor 106 in the computer 100 can be varied depending upon the available computer resources and the desired extent of protected operations.

In various embodiments, the hypervisor 106 is designed to reserve just enough hardware resources to support protected operations, and then, "get out of the way", so an operating system, such as Windows, Linux, etc. can be invoked by the BIOS or another VMM, such as VMWare, etc., that employs hardware resources not touched by the hypervisor 106 and interacts with the virtualized hardware resources made available by the hypervisor 106 for unprotected tasks.

In various embodiments, the hypervisor 106 will be embodied, in part, as a virtual machine monitor ("VMM") designed to virtualize some or all of the computer's hardware resources. The VMM can support one or more virtual machines ("VM"), which are software based machines that operate in a manner similar to a real machine. VMs can be used to emulate one system or hardware configuration using a different system or hardware configuration. For example, software designed to be executed by specific hardware may be executed on different hardware by using a VM to emulate the operation of the specific hardware on which the software was designed to be executed. A VMM can also be used to support the operation of one or more VMs on a single set of hardware resources by allocating portions of hardware for use by each VM. A VM utilizes the hardware resources or portions of hardware resources allocated to it by the VMM, typically without the knowledge of resources not allocated to the VM.

The portioning and allocation of hardware resources by the hypervisor 106 permits it to effectively "hide" hardware, such as a BIOS chip, or portions of hardware, such as a portion of random access memory ("RAM"), from VMMs and VMs thereby protecting the hardware from unauthorized access. Since the VM can only access the hardware it knows to exist, the hypervisor 106, by not providing information pertaining to the existence of hardware, thereby prevents the OSs from accessing the hidden or protected hardware.

Processor 102 is in communication with memory 104 adapted for use by processor 102. In this embodiment, memory 104 is Random Access Memory ("RAM") such as SRAM or DRAM but may be other types of memory as well. Memory 104 is shown comprised of protected area 112 and unprotected area 114 as portioned and allocated by hypervisor 106 in a manner described herein.

Basic Input/Output System ("BIOS") instructions 116 are located in BIOS device 110 which is in communication with processor 102. BIOS 116 consists of program instructions for identifying and initializing one or more devices in communication with processor 102, such as memory 104. In one embodiment, BIOS device 110 also contains data 120 that is to be protected and hypervisor 106 program instructions 118 for executing the hypervisor 106.

Figure 2:
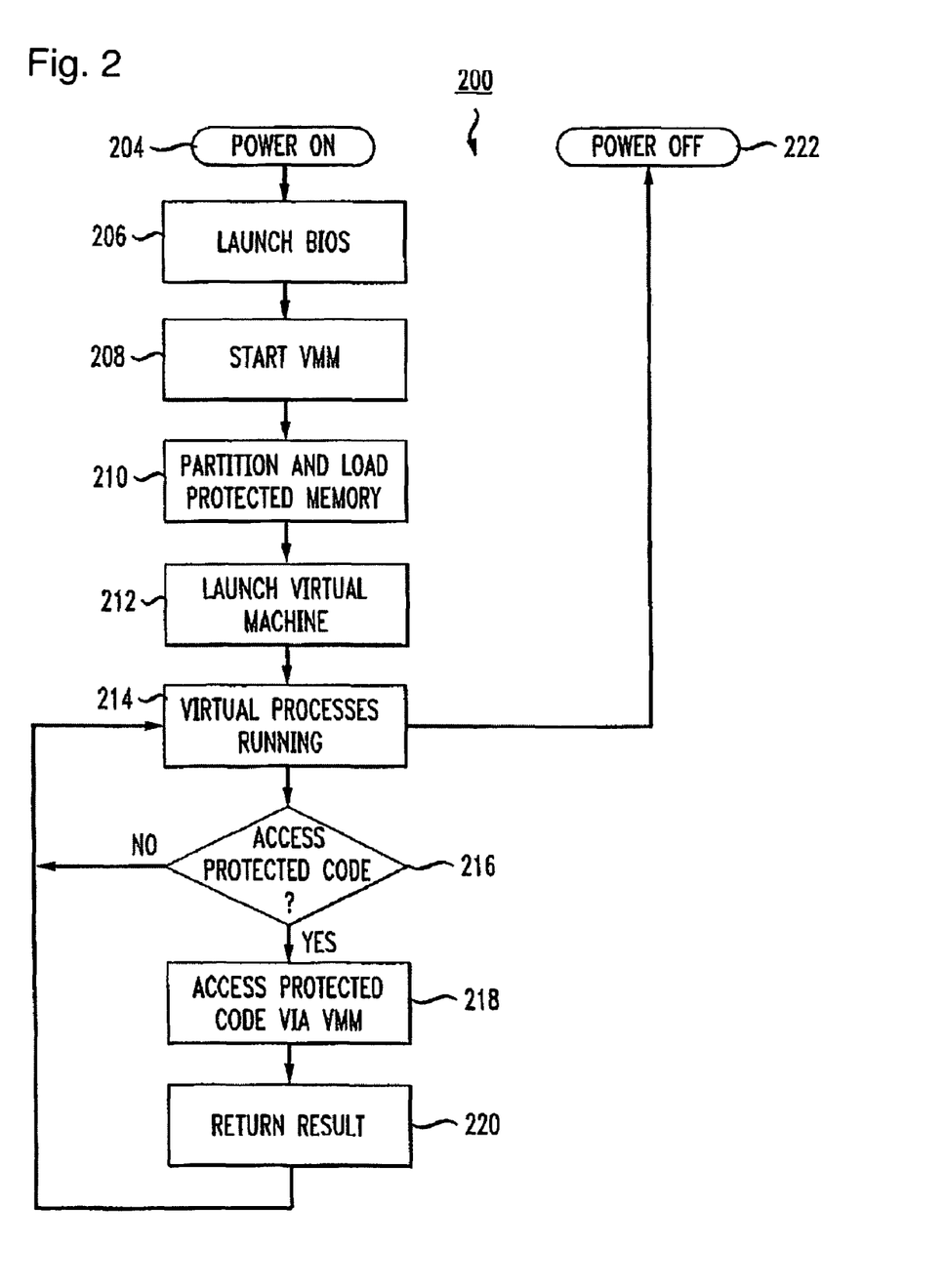
FIG. 2 depicts a flow chart illustrating a method of protecting data in a computer according to an embodiment of the present invention.

FIG. 2 depicts a flow chart illustrating one embodiment of the present invention which will now be described in conjunction with computer 100 depicted in FIG. 1. Computer 100 is powered on as indicated by block 204 of flow chart 200 depicted in FIG. 2. Processor 102 first retrieves and executes BIOS 116 which identifies and initializes one or more devices in communication with processor 102, such as memory 104 as well as other hardware (not shown). After BIOS 116 has completed the identification and initialization of the devices in communication with processor 102, hypervisor 106 program instructions 118 for implementing hypervisor 106 are read from the BIOS device 110 and executed by processor 102 as indicated by block 208. BIOS device 110 is protected from unauthorized access by allowing direct access to the device by only the BIOS and the hypervisor 106. It should be noted that while in this embodiment hypervisor program instructions 118 are stored in BIOS device 110, in other embodiments hypervisor program instructions 118 may be stored in other storage devices. In embodiments where hypervisor program instructions 118 are stored in locations other than BIOS device 110, the storage location should be protected as described herein to prevent direct access by the VM 108.

Although the hypervisor 106 can support the operation of multiple VMs, hypervisor 106 is shown in this embodiment supporting and managing the operation of one VM (108) for clarity. In various embodiments, a minimal hypervisor 106 with limited functionality is used, because it is less complex and therefore more resistant to attacks, such as attempted unauthorized access, modification, or manipulation. The functionality of the minimal hypervisor 106 may, in one embodiment, be limited to supporting a single VM, designating protected area 112 of memory 104, loading data 120 into protected area 112, accessing protected area 112 in response to a request from a VM, and preventing the VM from accessing protected area 112 or BIOS device 110 directly. However, a hypervisor 106 having greater functionality may be used in other embodiments as well so long as the hypervisor 106 provides the level of security desired to prevent access to the data to be protected. In addition, the functionality of the hypervisor 106, as described herein, may be integrated into complex VMMs, such as Xen or VMWare, if those VMMs provide the level of security desired to prevent access to the data to be protected.

The hypervisor 106 allocates a portion of memory 104 designated protected area 112 as indicated by block 210. Hypervisor 106 then accesses data 120 stored in BIOS device 110 and loads data 120 into protected area 112 as indicated by block 210. In one embodiment, protected area of memory 112 is sufficiently large to store not only data 120, but also additional data that may be used by hypervisor 106 as necessary. In other embodiments, the hypervisor 106 can allocate and portion hardware resources in a variety of ways. For example, if more than one VM is to be supported, the hypervisor 106 can allocate an equal portion of hardware resources to each VM or unequal portions based on criteria such as a predetermined priority level assigned to each VM. Each VM utilizes the portion of the hardware resources allocated to the VM by the hypervisor 106. In the present embodiment, the remainder of memory 104 comprises unprotected area of memory 114. After the hardware resources have been portioned and allocated, hypervisor 106 then launches VM 108 as indicated by block 212.

The hypervisor 106 informs VM 108 of the existence of all hardware and portions of hardware except protected area 112 of memory 104 and BIOS device 110. Therefore, VM 108 cannot directly access protected area 112 or BIOS device 110 because VM 108 is not aware of their existence. Protected area 112 of memory 104 and BIOS device 110 are therefore directly accessible only by hypervisor 106. VM 108 uses the hardware or portions of hardware available, with the exception of protected area 112 and BIOS device 110, to support the operation of VM 108 and to execute applications or processes invoked by VM 108 as shown in block 214.

VM 108 initiates and supports the operation of an operating system such as Microsoft Windows or Linux and any additional applications invoked using VM 108 as shown in block 214. When VM 202 requires access to the protected data stored in protected area 112 ("Yes" leader from conditional block 216), it transmits a hypercall to hypervisor 106.

A hypercall is similar to a function call and is used by VM 108 to request an action by hypervisor 106. The hypercall from VM 108 requests hypervisor 106 to access the protected data stored in protected area 112. In response to the hypercall, hypervisor 106 accesses the protected data stored in the protected area of memory as depicted by block 218. hypervisor 106 then returns a result to VM 108 as indicated by block 220. VM 106 may then use the result returned by hypervisor 106 without having direct access to the protected data stored in protected area 112. Therefore, VM 108 can indirectly access the protected data stored in protected area 112 via hypervisor 106.

Protected area 112 may contain non-functional data or information, such as cryptographic keys, personal information, or passwords. The data to be protected may also be functional or executable and adapted to perform various operations. For example, it could contain code to decrypt or encrypt messages, verify the authenticity of software, produce or verify cryptographic hashes, or generate pseudo-random numbers, as well as other algorithms or program instructions. The data to be protected should be configured to prevent the leakage of the data to be protected through the hypervisor 106. This involves making sure that the data to be protected, especially when the data is executable or consists of program instructions, does not contain vulnerabilities or side-channels such as timing attacks or cache usage attacks.

In some embodiments, the data to be protected may consist of program instructions adapted to access hardware-based security modules, for example, a Trusted Platform Module (TPM). In one embodiment, the data to be protected may use a TPM to generate and manage keys for accessing the data to be protected.

In the present embodiment, VM 108 continues to run applications as indicated by block 214 and transmit hypercalls to hypervisor 106 as required until VM 108 is shut down or powered off as indicated by block 222.

Figure 3:
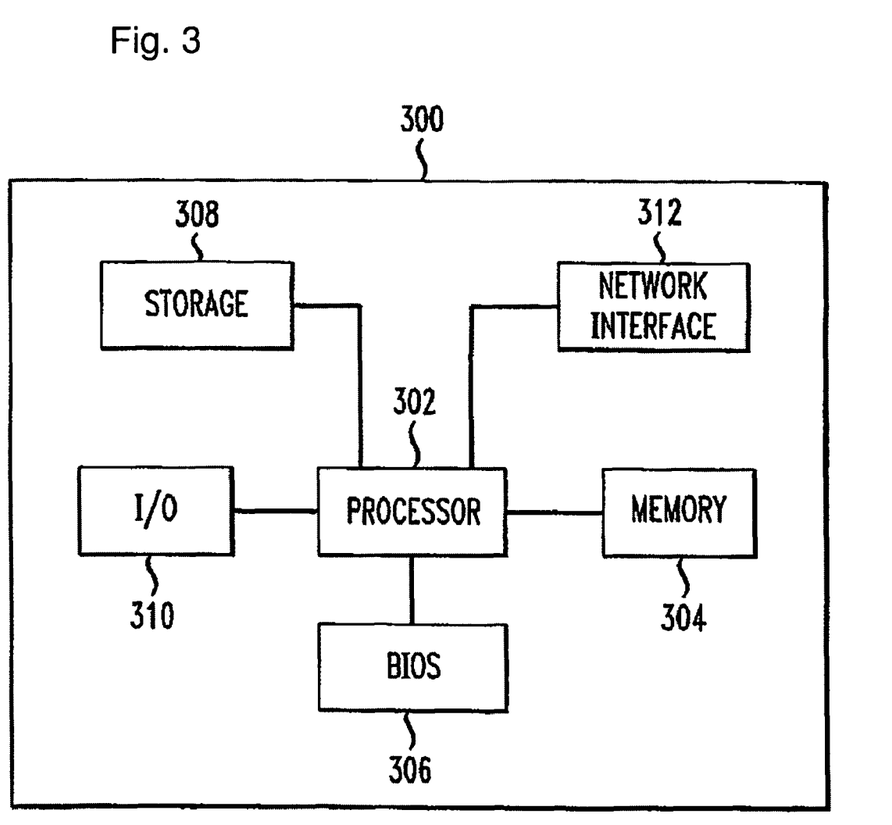
FIG. 3 depicts a computer in which data may be protected in accordance with one embodiment of the present invention.

FIG. 3 depicts a computer 300 capable of implementing the present invention. While FIG. 1 shows the functional blocks of one embodiment, FIG. 3 shows hardware for implementing the functions described in conjunction with FIGS. 1 and 2. Computer 300 includes processor 302 which, in this embodiment, has virtualization capabilities. The virtualization capabilities of processor 302 provide support for the operation of hypervisor 106.

Processor 302 is in communication with memory 304 which is adapted for use by processor 302. In this embodiment, memory 304 is Random Access Memory ("RAM"), such as SRAM or DRAM, but may be other types of memory as well. Processor 302 is also in communication with BIOS chip 306 which, in one embodiment, stores program instructions for identifying and initializing components in communication with processor 302, program instructions for hypervisor 106, and data to be protected.

In other embodiments, the hypervisor 106 program instructions and data to be protected may be stored on other storage devices in various combinations. For example, the hypervisor 106 may be stored on the BIOS chip and the data to be protected may be stored on a USB key. The location where the hypervisor 106 program instructions and code to be protected are stored should provide or be adapted to provide a desired level of security to prevent the unauthorized access, manipulation, or modification of the hypervisor 106 program instructions or data to be protected.

Processor 302 is in communication with storage 308 which may include one or more of a hard disk drive, flash drive, optical drive, floppy disk drive, or other types of internal or external devices for storing data. Processor 302 is also in communication with network interface 312 which provides access to other devices connected to a network. Processor 302 is in communication with I/O 310 which may consist of one or more of a keyboard, monitor, mouse, or other devices used to provide a person-machine interface.

One of ordinary skill in the art will appreciate that the hardware and process implementations of FIGS. 1-3 are exemplary and numerous other embodiments are contemplated by the present invention. For example, the memory 104 in FIG. 1 could be embodied as at least two separate memory devices, one allocated by the hypervisor for protected content and the others allocated to unprotected use. Furthering the example, it may be desirable to make available and dedicate hardware resources for use in protected content operations. The hypervisor 106 would restrict access to the protected hardware components performing functions including memory, storage, processing, etc.

In various embodiments, the hypervisor 106 executes protected data consisting of program instructions. In other embodiments, the hypervisor 106 can load data to be protected consisting of program instructions into an additional virtual machine. The hypervisor 106 may then request the additional VM to execute the protected data consisting of program instructions when desired. In these embodiments using an additional VM to execute protected data consisting of program instructions, the hypervisor 106 should be adapted to prevent unauthorized access to the additional VM running the data to be protected.

In some embodiments supporting more than one VM, the hypervisor 106 may be configured to support varying security models for different VMs. The hypervisor 106 may also be configured to control which hypercalls are available to specific VMs. In addition, for a particular VM, the hypervisor 106 may control which hypercalls may be used by particular applications running on a particular VM. This may be accomplished by notification to the hypervisor 106 of context switches or through the monitoring of memory or register states, or any other method of notifying the hypervisor 106 of the security model to be used for each VM.

The hypervisor 106 may also include an interface to load "hyperprograms" into the protected area of memory. The interface may be implemented in a VM, an operating system run on a particular VM, or an application run by a particular VM. These hyperprograms may provide an extended interface to an operating system or other applications run on one or more VMs. The newly loaded hyperprograms may be verified for integrity and decrypted by secret keys stored in the protected area of memory or in other hardware-based security modules. In this way, only authorized hyperprograms will be loaded. In addition, access to the hyperprograms may be controlled by the hypervisor 106 such that only particular VMs, operating systems run on a particular VM, or applications will be given access to the hyperprograms.

Figure 4:
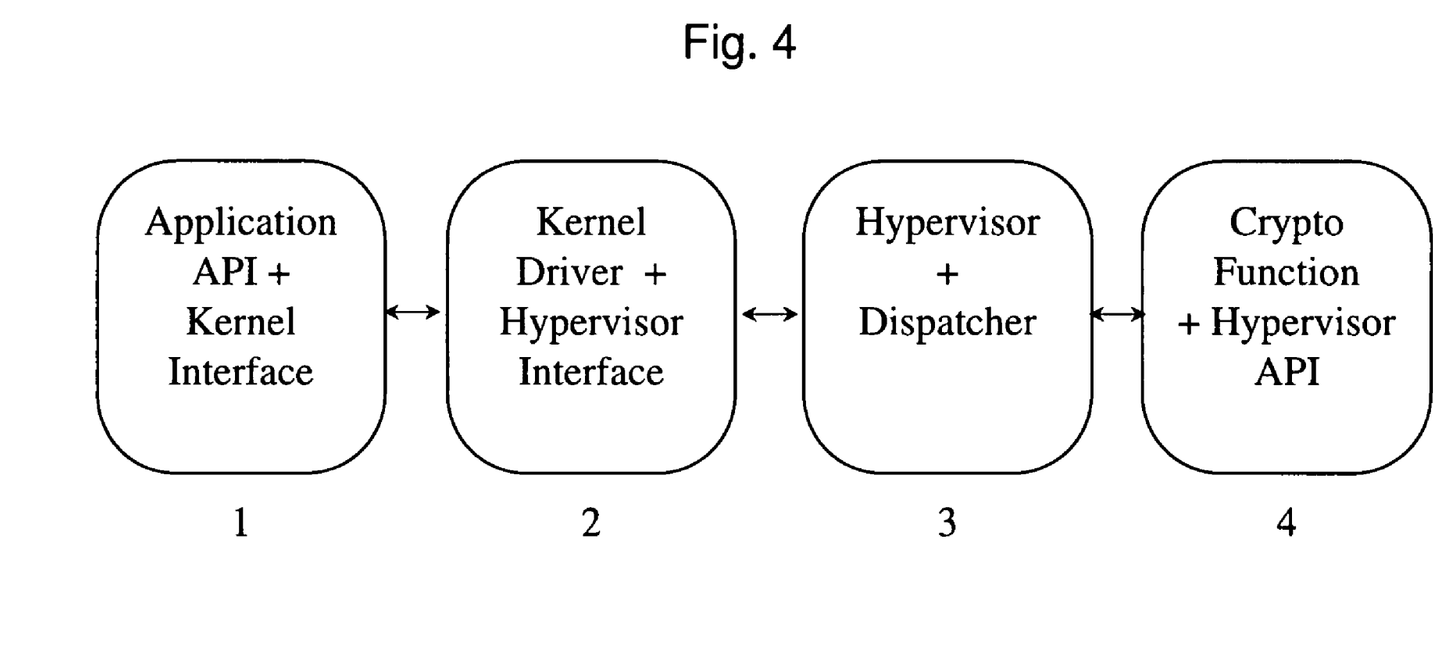
FIG. 4 depicts an exemplary architectural embodiment of the present invention.

When the present invention is embodied as a virtual hardware security module ("VHSM") it should generally be designed with three main goals in mind: security, performance, and portability. This generally leads to architectures with several components separated by minimal, well-defined interfaces as shown in FIG. 4.

In these embodiments, cryptographic requests originate in an application (Block 1) running in a commodity OS (Block 2). These requests can be made through standard cryptographic Application Programming Interfaces ("APIs"), like OpenSSL, where specific plug-ins translate each request to a call to a vHSM kernel driver. The kernel ensures that the application is permitted by policy to access the vHSM, and then passes the request to a dispatcher running outside the OS via a hypercall. The dispatcher checks the request against the key policy before passing it on to the specified cryptographic algorithm which has access to the keying material needed to complete the request. The result of the computation is then returned to the application. In some environments, the kernel driver can grant the application sufficient permissions to make the hypercall directly for performance reasons.

The hypervisor 106 can support existing pluggable APIs to allow existing applications to benefit from the increased security of the vHSM without requiring code modifications. In the case of OpenSSL, this functionality can be provided in the form of an "OpenSSL Engine" that translates OpenSSL calls into hypervisor 106 calls. For Java JCE calls, a JNI interface can be used to make the hypervisor 106 calls. APIs that do not support a pluggable architecture can still be supported; in these cases, a stub library that intercepts calls that need to be passed to the hypervisor 106 can be inserted between the application and the library implementing the original API.

The kernel driver can provide the mechanism for establishing the communications channel with the dispatcher running outside the OS via hypercalls and shared memory buffers. It also can enable the setting of policies on such calls on a per application basis. In some environments, the driver is also responsible for loading the hypervisor, managing the CPUs, or other tasks.

For example, a Linux driver can expose a Linux block device for each hypercall. Applications can then be granted access to a hypercall using standard Linux permissions, ACLs, or SELinux policies. The devices can allow the Application API libraries to create memory buffers to be shared with the hypervisor, to dispatch hypercalls, and to efficiently wait for such calls to return (via mmap, ioctl, and epoll). The specific method by which each call is made depends on the running hypervisor.

The hypervisor 106 dispatcher can either run in a stand-alone secure hypervisor or in an existing hypervisor such as VMWare or Xen. In the case of the stand-alone hypervisor, Intel's Trusted Execution Technology (TXT) can be used to establish a root of trust rooted in the system's Trusted Platform Module and hardware virtualization (VMX and VT-d) used to protect the hypervisor from the operating system and applications. On AMD platforms, the Secure Virtual Machine (SVM) extensions can be used to accomplish the same goal. Hypercalls can be made either through VMEXIT events from the operating system or via shared memory writes to cores in a MONITOR/MWAIT state, depending on the performance characteristics required.

When integrating into an existing VMWare or Xen environment, the dispatcher can run as an additional guest VM with support for using a virtualized TPM to generate a chain of trust. In this case, hypercalls are made using Xen or VMWare's built-in inter-VM communications mechanisms. This environment provides a high degree of flexibility for administrators, but may not provide as high a level of security as the stand-alone hypervisor since VMWare or Xen must be trusted.

In various embodiments, the hypervisor 106 of the present invention establishes a protected memory and invokes another VMM, such as VMWare or Xen to virtualize the unprotected portion of the hardware. In still other embodiments, the vHSM is implemented as part of another VMM, preferably before other aspects of the VMM, such that the protected memory is not accessible even if the underlying VMM can be compromised.

The cryptographic functions can be implemented using Intel's Performance Primitives, FIPS-certified optimized versions of standard cryptographic primitives, or other techniques. Additionally, care must be taken to thwart side channel analyses, such as timing and cache attacks, that could compromise the security of protected content.

Furthermore, the hypervisor can include API that is responsible for providing basic services such as random number generation, trusted counters, and secure storage to the cryptographic functions. This can be accomplished, for example, through the assistance of the TPM, virtualized TPM, or through services provided by Xen or VMWare, depending on the environment.

The present invention can be implemented in many ways by the skilled artisan. For security application, it is often desirable to implement the present invention, first as a proof of concept before a full implementation is attempted. A proof of concept for the protection mechanism implementation can be performed on a single hardware configuration before production versions are produced. The concept implementation can allow validation of the core security design as well as evaluation of the performance characteristics.

There are usually two main objectives for the proof of concept phase. The first is to implement and attempt to attack a proof of concept of the proposed protection mechanism. This is to validate the core security design. The second objective is to use this proof of concept to gather performance data under various circumstances. This data will guide the design tradeoffs when transitioning from the proof of concept to a full product implementation.

An exemplary proof of concept procedure for a single, simple hardware configuration can be as follows:
  (a) implement a proof of concept hypervisor that
    i. boots out of a BIOS,
    ii. uses hardware virtualization features to protect itself and the BIOS,
    iii. launches an operating system, e.g., Linux, Windows, etc.
    iv. allows the operating system black-box access to a pre-keyed Advanced Encryption Standard (AES) implementation running in the hypervisor.
  (b) conduct a security attack and analysis of both the design and implementation of the proof of concept to provide assurance as to the security of the system.
  (c) run micro- and macro-benchmarks measuring the performance of the system under various loads to provide insights into the overhead incurred by various parts of the system.

Both Intel and AMD include hardware virtualization in some of their processors. In an exemplary proof of concept, AMD Opteron processor is employed because its device protection and page table shadowing features can be somewhat easier to implement. LinuxBIOS can be loaded into the BIOS and used to boot a stock distribution of Linux to verify that the base hardware is working as expected.

A protection-less hypervisor can be created by modifying LinuxBIOS to pass off control to a first iteration of the hypervisor. This version may not attempt to set up any sort of protections or provide any callbacks, but instead will simply initialize the hardware virtualization features and start a basic operating system using the virtualization. While a proof of concept hypervisor will typically utilize a single core of a single processor, it is understood that production versions of the hypervisor can include multiple cores, CPUs, and/or operating systems.

Support for launching a Linux kernel can then be added to the hypervisor, which involves adding support for loading, and possibly uncompressing Executable and Linkable Format (ELF) binaries. The hypervisor can then be modified to configure the memory protection features of the hardware virtualization, so that Linux is unable to access the memory used by the hypervisor. A Linux program can be developed to test that Linux's view of the memory space does not include that of the hypervisor.

Besides protecting the memory where the BIOS is mapped, access to I/O on an Local Procedure Call (LPC) bus can also be protected. A Linux program that attempts to access the bus can be developed as part of a test bench.

While the standard memory protection techniques prevent the virtualized operating system from accessing the hypervisor's memory, the OS could potentially program one of the devices in the system to use direct memory access (DMA) to bypass this protection. Therefore, the Device Exclusion Vector (DEV) feature of the hardware virtualization should be configured to prevent DMA to the hypervisor and BIOS memory pages. A Linux program that attempts to use DMA to access these pages can be developed as part of the test bench.

Using VMCALL hardware support, the Linux instance can be used to request that the hypervisor run some protected code. When moving content between Linux and the protected code in the hypervisor care must be taken to avoid the introduction of leaks/vulnerabilities. The initial protected code can comprise a simple function whose results will be returned to Linux to test the procedure. A Linux kernel device driver that supports these hypercalls can be developed.

Instead of running as system privileges in the hypervisor, the protected code should be moved into Ring 3 in the hypervisor. The protected code can be given a pre-allocated block of memory and its only interaction with the hypervisor will be to signal that a result is ready to be returned to the OS. Once the computation is complete, the result can be copied and the memory cleared.

The simple protected function can be replaced with an implementation of AES that is pre-keyed or any other information that is sought to be protected. Both the implementation and the key can be stored in the BIOS and protected by the hypervisor. A test program in Linux can be developed to ensure that the implementation is functioning normally.

Given the present invention relates to security, it is recommended that vulnerability analysts not involved in the implementation of the proof of concept be given access to the code, any design documents, and the running systems, so they can attempt to exploit deficiencies either in the design or the implementation, which can then be repaired prior to development of the production version.

It is desirable to establish performance benchmarks to assess the implementation. For example, measurements can be performed, such as:
  a. Time required to boot from start of hypervisor to start of Linux kernel
  b. Time required for a no-op hypercall
  c. Time required to set up the Ring 3 environment for protected code d. Maximum number of web requests that can be processed per second, given hypercalls that last various lengths of time, which measures the system's ability to do DMA-based transfers while the processor is servicing hypercalls.

The present invention can be deployed in any industry, where there is a desire to limit access to information in a computer. For example, companies that manage large clusters of SSL enabled webservers, both managed hosting companies serving multiple clients and "Web 2.0" companies with a large datacenter presence, have expressed a need for protecting SSL private certificates without the use of hardware accelerators. These companies often claim that it is currently more cost effective to compute the RSA signatures required by SSL in software, but they continue to use hardware because of concern about attackers gaining remote access to the web servers and thus possibly stealing the private keys. The present invention addresses those concerns, because even if an attacker gained root access to one of these servers the keys remain secure within the hypervisor. While the attacker would gain access to any encrypted traffic during the attack, once the attack was identified and the vulnerability patched, the traffic would once again be secure without the need to revoke and replace the keys. These companies tend to use a large number of relatively similar, relatively current servers which would simplify the process of adapting the software for the specific hardware requirements.

Another application includes companies that produce hardware that requires sophisticated, proprietary signal processing to occur in software. The image processing algorithms used in these applications are perfect candidates for protection using the present invention.

More generally, many industries can benefit from the present invention, if it is applied to database applications as a means of protecting sensitive information, such as personal records or proprietary information. For example, sensitive information could only be exposed on a record by record basis, such that potential abusers of the information are dramatically limited in the amount of information that they can extract and exploit. The hypervisor can be implemented with rules that control and limit access to the protected content, such that only certain users and applications can access certain content at certain times.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method of protecting content in a computer comprising the steps of:
   executing a hypervisor in a processor for interacting with an operating system in a computer;
   storing protected content in addition to hypervisor code and associated content in a protected area of memory accessible only by the hypervisor; and
   limiting access to the protected content by the operating system to only via the hypervisor and as limited by the hypervisor.

2. The method of claim 1, wherein the operating system has direct access to hardware resources of the computer that do not contain the protected content.

3. The method of claim 1, wherein executing the hypervisor includes
   virtualizing a memory device,
   partitioning the memory of the memory device into protected and unprotected areas, and,
   allowing access by an operating system to only the unprotected areas.

4. The method of claim 1, wherein executing the hypervisor includes initializing the hypervisor from BIOS.

5. The method of claim 1, wherein storing protected content includes loading protected content from at least one of a BIOS chip and a storage device to the protected area.

6. The method of claim 1, further comprising configuring applications and the operating system to make hypercalls to the hypervisor to access the protected content.

7. The method of claim 1, wherein storing includes storing cryptographic keys in the protected area and further comprising configuring applications running in the operating system to make hypercalls to the hypervisor to decode information using the cryptographic keys.

8. The method of claim 1, wherein storing includes storing an algorithm in the protected area and further comprising configuring applications to make hypercalls to the hypervisor containing input to the algorithm and the hypervisor returning a result of running the algorithm with the input.

9. The method of claim 1, wherein executing includes executing the hypervisor in BIOS with the hypervisor preventing access to the BIOS by the operating system and applications running therein.

10. The method of claim 1, wherein executing includes executing the hypervisor to prevent entire hardware resources from being access by the operating system and applications running in the operating system, except as controlled by the hypervisor.

11. The method of claim 1, wherein executing includes executing the hypervisor in a processor configured to support virtualization, virtualizing hardware resources and allowing direct access by the operating system and applications running in the operating to unprotected areas of the virtualized hardware resources.

12. The method of claim 1, wherein executing includes executing the hypervisor to virtualize hardware resources and invoking a virtual machine monitor to partition unprotected areas of the virtualized hardware resources among at least one virtual machine.

13. A computer comprising:
   a BIOS device including instructions for initializing operations including at least operating system;
   a memory device configured to stored content;
   a processor configured to execute instructions from BIOS device and execute a hypervisor that partitions memory on the memory device into a protected area for storing protected content in addition to hypervisor code and associated content and an unprotected area for storing unprotected content, prevents access to the BIOS and other protected hardware resources, and limits access to the protected content by the operating system to only via the hypervisor and as limited by the hypervisor.

14. The computer of claim 13, wherein the operating system has direct access to hardware resource of the computer that do not contain the protected content.

15. The computer of claim 13, wherein the processor executes the hypervisor, so as to virtualize the memory of the memory device and partition the memory into protected and unprotected areas.

16. The computer of claim 13, wherein the BIOS device includes instruction for the processor to execute the hypervisor.

17. The computer of claim 13, wherein the BIOS device includes protected content that is to be loaded into the protected area of the memory device.

18. The computer of claim 13, wherein the BIOS invokes a virtual machine monitor to partition virtualize unprotected hardware resources among at least one virtual machine.

19. A computer readable medium having instructions stored thereon, wherein the instructions when executed by a processor cause the processor to carry out the steps comprising:
   executing a hypervisor in a processor for interacting with an operating system in a computer;
   storing protected content in addition to hypervisor code and associated content in a protected area of memory accessible only by the executed hypervisor; and
   limiting access to the protected content by the operating system to only via the hypervisor and as limited by the hypervisor.

20. The medium of claim 19, wherein the medium is at least one of a BIOS chip within a computer and a storage device connectable to the computer.

\* \* \* \* \*